US012609321B2

(12) United States Patent
Kono et al.

(10) Patent No.: US 12,609,321 B2
(45) **Date of Patent: *Apr. 21, 2026**

(54) BINDER FOR SECONDARY BATTERIES

(71) Applicant: Sumitomo Seika Chemicals Co., Ltd., Harima-cho (JP)

(72) Inventors: Yuki Kono, Harima-cho (JP); Moe Inui, Harima-cho (JP); Shun Hashimoto, Harima-cho (JP)

(73) Assignee: Sumitomo Seika Chemicals Co., Ltd., Harima-cho (JP)

( * ) Notice: Subject to any disclaimer, the term of this patent is extended or adjusted under 35 U.S.C. 154(b) by 762 days.

This patent is subject to a terminal disclaimer.

(21) Appl. No.: 17/778,220

(22) PCT Filed: Nov. 9, 2020

(86) PCT No.: PCT/JP2020/041741

§ 371 (c)(1),
(2) Date: May 19, 2022

(87) PCT Pub. No.: WO2021/100521

PCT Pub. Date: May 27, 2021

(65) Prior Publication Data

US 2023/0041792 A1 Feb. 9, 2023

(30) Foreign Application Priority Data

Nov. 19, 2019 (JP) ................................ 2019-208849

(51) Int. Cl.

| | |
|---|---|
| ***H01M 4/62*** | (2006.01) |
| ***C08F 216/06*** | (2006.01) |
| ***C08F 220/06*** | (2006.01) |
| ***H01M 4/133*** | (2010.01) |
| ***H01M 4/134*** | (2010.01) |
| ***H01M 4/36*** | (2006.01) |
| ***H01M 4/48*** | (2010.01) |
| ***H01M 4/587*** | (2010.01) |
| ***H01M 10/0525*** | (2010.01) |

(52) U.S. Cl.

CPC ........... *H01M 4/622* (2013.01); *C08F 216/06* (2013.01); *C08F 220/06* (2013.01); *H01M 4/133* (2013.01); *H01M 4/134* (2013.01); *H01M 4/364* (2013.01); *H01M 4/483* (2013.01); *H01M 4/587* (2013.01); *H01M 10/0525* (2013.01)

(58) Field of Classification Search

CPC ...... H01M 4/587; H01M 4/483; H01M 4/364; H01M 4/133; H01M 4/134; H01M 4/622; C08F 220/06; C08F 216/06

USPC .......................................................... 429/217

See application file for complete search history.

(56) References Cited

U.S. PATENT DOCUMENTS

| | | |
|---|---|---|
| 4,885,105 A | 12/1989 | Yang et al. |
| 5,153,082 A | 10/1992 | Ogino et al. |
| 6,737,013 B1 | 5/2004 | Kusudou et al. |
| 2015/0280237 A1 | 10/2015 | Mukai et al. |
| 2016/0156024 A1 | 6/2016 | Kinpara et al. |

(Continued)

FOREIGN PATENT DOCUMENTS

| | | |
|---|---|---|
| CN | 1157455 | 7/2004 |
| JP | H04-188559 A | 7/1992 |

(Continued)

OTHER PUBLICATIONS

WO 2021111933 A machine translation (Year: 2021).*

(Continued)

*Primary Examiner* — Jonathan G Leong
*Assistant Examiner* — John S Medley
(74) *Attorney, Agent, or Firm* — Knobbe, Martens, Olson & Bear, LLP

(57) ABSTRACT

The present invention provides a binder for a secondary battery that can reduce the initial resistance value of the secondary battery. A binder for a secondary battery comprising a polymer compound, wherein the polymer compound contains repeating units represented by formulae (1), (2), and (3):

[Formula 1]

(1)

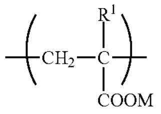

(2)

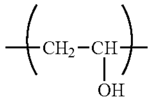

(3)

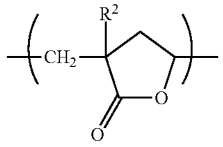

in formula (1), $R^1$ is a hydrogen atom or a methyl group, and M is a hydrogen atom or an alkali metal atom; and in formula (3), $R^2$ is a hydrogen atom or a methyl group; and when a total ratio of repeating units constituting the polymer compound is taken as 100 mol %, a total ratio of the repeating unit represented by formula (3) is less than 2 mol %.

7 Claims, No Drawings

(56) References Cited

U.S. PATENT DOCUMENTS

| | | | | |
|---|---|---|---|---|
| 2017/0022451 | A1* | 1/2017 | Tamareselvy | C11D 3/3757 |
| 2018/0097235 | A1 | 4/2018 | Yang et al. | |
| 2020/0157255 | A1* | 5/2020 | Tachibana | C08F 216/06 |
| 2022/0416248 | A1* | 12/2022 | Kono | H01M 4/622 |

FOREIGN PATENT DOCUMENTS

| | | | | |
|---|---|---|---|---|
| JP | H07-240201 | A | 9/1995 | |
| JP | H08-264180 | A | 10/1996 | |
| JP | H10-284082 | A | 10/1998 | |
| JP | H10-294112 | A | 11/1998 | |
| JP | H10-302799 | A | 11/1998 | |
| WO | WO 2004-049475 | A1 | 6/2004 | |
| WO | WO 2014/207967 | A1 | 12/2014 | |
| WO | WO 2018/168520 | A1 | 9/2018 | |
| WO | WO-2018225742 | A1 * | 12/2018 | C08F 299/00 |
| WO | WO-2021111933 | A1 * | 6/2021 | H01G 11/38 |

OTHER PUBLICATIONS

International Search Report in PCT/2020/041741 issued Jan. 19, 2021.

Ogumi, Z et al. 2008 “Lithium Secondary Batteries”, published by Ohmsha Ltd., pp. 132-135 of 209 pages.

Taiwanese Office Action in Application No. 109139970, dated Nov. 4, 2024 (in 4 pages).

Extended European Search Report issued for counterpart European Patent Application No. 20889457.6, issued on Nov. 6, 2023.

* cited by examiner

BINDER FOR SECONDARY BATTERIES

TECHNICAL FIELD

The present invention relates to a binder for a secondary battery, a mixture for a secondary battery electrode, an electrode for a secondary battery, and a secondary battery.

BACKGROUND ART

In recent years, with a growing interest in solving environmental issues, and realizing a sustainable recycling-based society, research on nonaqueous electrolyte secondary batteries, such as lithium-ion secondary batteries, has been actively made. Lithium-ion secondary batteries are used as power sources for notebook computers, mobile phones, electric vehicles, and the like, because of their high operating voltage and high energy density. In these applications, the lithium-ion secondary batteries need to be repeatedly charged and discharged, and reused, and thus, are required to have a longer battery life.

An electrode for a lithium-ion secondary battery is typically produced as follows: A mixture slurry for a battery electrode (hereinafter sometimes simply referred to as "the slurry"), obtained by mixing an active material (electrode active material), a conductive assistant, and the like into a solution or a slurry in which a binder for a battery electrode is dissolved in a solvent or dispersed in a dispersion medium, is applied to a current collector. Then, the solvent or the dispersion medium is removed using a method such as drying to bind between the active material and the current collector, and between particles of the active material.

For example, a positive electrode is obtained by coating an aluminum foil current collector with a positive electrode mixture slurry in which an active material (such as lithium cobaltate ($LiCoO_2$)), a binder (such as polyvinylidene fluoride (PVDF)), a conductive assistant (such as carbon black), and the like are dispersed in a dispersion medium, and by drying the slurry.

On the other hand, a negative electrode is obtained by coating a copper foil current collector with a negative electrode mixture slurry in which an active material (such as graphite), a binder (such as carboxymethylcellulose (CMC), styrene-butadiene rubber (SBR), PVDF, or polyimide), a conductive assistant (such as carbon black), and the like are dispersed in water or an organic solvent, and by drying the slurry.

CITATION LIST

Patent Literature

Patent Literature 1: JP H 8-264180 A
Patent Literature 2: JP H 4-188559 A
Patent Literature 3: JP H 10-284082 A
Patent Literature 4: JP H 7-240201 A
Patent Literature 5: JP H 10-294112 A
Patent Literature 6: WO 2004/049475
Patent Literature 7: JP H 10-302799 A

Non Patent Literature

Non Patent Literature 1: "Lithium Secondary Batteries", p. 132 (published by Ohmsha Ltd. on Mar. 20, 2008)

SUMMARY OF INVENTION

Technical Problem

With increasing use of lithium-ion secondary batteries, the use of various types of graphite as negative electrode active materials that directly contribute to the electrode reaction has been studied, mainly for the purpose of increasing the battery capacity. In particular, it is known that artificial graphite varies in crystalline state depending on the raw material, the carbonization temperature, and the like, leading to variations in the energy capacity of the artificial graphite as a negative electrode active material. Thus, various materials such as graphitizing carbon (soft carbon), non-graphitizing carbon (hard carbon), and carbon fibers have been studied (see Patent Literatures 1 to 3).

For the purpose of further increasing the capacity of lithium-ion secondary batteries, various compounds have been proposed as electrode active materials that directly contribute to the electrode reaction. Silicon (Si), tin (Sn), and germanium (Ge) that can be alloyed with lithium, or oxides and alloys thereof, for example, have been studied as negative electrode active materials. These negative electrode active materials have higher theoretical capacity density than carbon materials. In particular, silicon-containing particles, such as silicon particles or silicon oxide particles, are inexpensive, and thus have been widely studied (see Patent Literatures 4 and 5 and Non Patent Literature 1).

Polyvinylidene fluoride (PVDF) has been heretofore widely used as a binder. However, because PVDF is soluble only in an organic solvent, there has been a need for a binder that can reduce the environmental burden (see Patent Literatures 6 and 7).

Study has been made on the use of a rubbery polymer, styrene-butadiene rubber (SBR), as an aqueous binder that is expected to provide the effect of reducing the environmental burden. However, the use of an electrode produced with styrene-butadiene rubber (SBR) as a binder has a problem in that the initial resistance value of the secondary battery increases.

Under such circumstances, it is a main object of the present invention to provide a binder for a secondary battery that can reduce the initial resistance value of the secondary battery. It is also an object of the present invention to provide a mixture for a secondary battery electrode, an electrode for a secondary battery, and a secondary battery obtained using the binder for a secondary battery.

Solution to Problem

The present inventors have conducted extensive research to solve the above-described problem. As a result, they have found that the initial resistance value of a secondary battery is reduced by using a binder for a secondary battery comprising a polymer compound, wherein the polymer compound contains repeating units represented by formulae (1), (2), and (3) shown below, and when a total ratio of repeating units constituting the polymer compound is taken as 100 mol %, the upper limit of a total ratio of the repeating unit containing a lactone structure, represented by formula (3), is set below a predetermined value. The present invention has been completed after further research based on this finding.

[Formula 1]

(1)

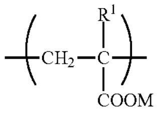

(2)

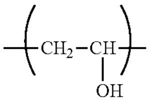

(3)

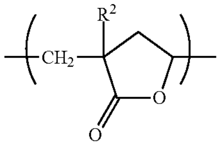

In formula (1), $R^1$ is a hydrogen atom or a methyl group, and M is a hydrogen atom or an alkali metal atom; and in formula (3). $R^2$ is a hydrogen atom or a methyl group.

In summary, the present invention provides aspects of the invention comprising the following features:

Item 1. A binder for a secondary battery comprising a polymer compound, wherein the polymer compound contains repeating units represented by formulae (1), (2), and (3):

[Formula 2]

(1)

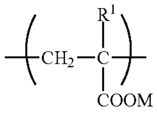

(2)

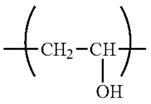

(3)

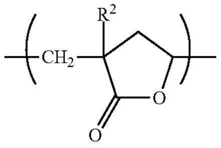

in formula (1), $R^1$ is a hydrogen atom or a methyl group, and M is a hydrogen atom or an alkali metal atom; and in formula (3). $R^2$ is a hydrogen atom or a methyl group; and when a total ratio of repeating units constituting the polymer compound is taken as 100 mol %, a total ratio of the repeating unit represented by formula (3) is less than 2 mol %.

Item 2. The binder for a secondary battery according to item 1, wherein when the total ratio of repeating units constituting the polymer compound is taken as 100 mol %, the total ratio of the repeating unit represented by formula (3) is 0.1 mol % or more.

Item 3. The binder for a secondary battery according to item 1 or 2, wherein when the total ratio of repeating units constituting the polymer compound is taken as 100 mol %, a total ratio of the repeating unit represented by formula (1) is 5 mol % or more and 50 mol % or less.

Item 4. A mixture for a secondary battery electrode comprising the binder for a secondary battery according to any one of items 1 to 3 and an active material.

Item 5. The mixture for a secondary battery electrode according to item 4, wherein the active material contains a carbon material.

Item 6. The mixture for a secondary battery electrode according to item 4 or 5, wherein the active material contains at least one of silicon and silicon oxide.

Item 7. An electrode for a secondary battery comprising the mixture for a secondary battery electrode according to any one of items 4 to 6.

Item 8. A secondary battery comprising the electrode for a secondary battery according to item 7.

Item 9. A lithium-ion secondary battery comprising the electrode for a secondary battery according to item 7.

Advantageous Effects of Invention

The present invention can provide a binder for a secondary battery that can reduce the initial resistance value of the secondary battery. The present invention also aims to provide a mixture for a secondary battery electrode, an electrode for a secondary battery, and a secondary battery (such as a lithium-ion secondary battery) obtained using the binder for a secondary battery.

DESCRIPTION OF EMBODIMENTS

A binder for a secondary battery according to the present invention is a binder for a secondary battery comprising a polymer compound, wherein the polymer compound contains repeating units represented by formulae (1), (2), and (3) shown below, and when a total ratio of repeating units constituting the polymer compound is taken as 100 mol %, a total ratio of the repeating unit represented by formula (3) is less than 2 mol %. Because of these features, the binder for a secondary battery of the present invention (hereinafter sometimes referred to as "the binder") can reduce the initial resistance value of the secondary battery. The following describes in detail the binder for a secondary battery of the present invention, and a mixture for a secondary battery electrode, an electrode for a secondary battery, and a secondary battery (such as a lithium-ion secondary battery) obtained using the binder for a secondary battery.

[Formula 3]

(1)

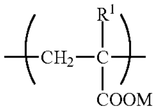

(2)

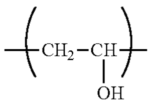

(3)

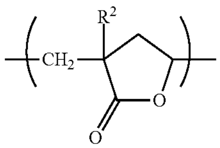

In formula (1), $R^1$ is a hydrogen atom or a methyl group, and M is a hydrogen atom or an alkali metal atom; and in formula (3), $R^2$ is a hydrogen atom or a methyl group.

As used herein, the term "comprising" includes "consisting essentially of" and "consisting of". As used herein, the term "(meth)acrylic" refers to "acrylic or methacrylic", and the term "(meth)acrylate" refers to "acrylate or methacrylate".

As used herein, values connected with "to" refer to the numerical range including the values before and after "to" as the lower and upper limits. When a plurality of lower limits and a plurality of upper limits are mentioned separately, any lower limit and any upper limit may be selected and connected with "to".

1. Binder for Secondary Battery

The binder for a secondary battery of the present invention is a binder for a secondary battery comprising a polymer compound. The polymer compound contains repeating units represented by formulae (1). (2), and (3). When a total ratio of repeating units constituting the polymer compound is taken as 100 mol %, a total ratio of the repeating unit represented by formula (3) is less than 2 mol %.

The repeating unit represented by formula (1) is an acrylic acid-based repeating unit.

In formula (1), $R^1$ is a hydrogen atom or a methyl group. The polymer compound may contain at least one of the repeating unit in which $R^1$ is a hydrogen atom and the repeating unit in which $R^1$ is a methyl group. That is, the repeating unit of formula (1) contained in the polymer compound may be only the repeating unit of formula (1) in which $R^1$ is a hydrogen atom or only the repeating unit of formula (1) in which $R^1$ is a methyl group, or may contain both.

In formula (1), M is a hydrogen atom or an alkali metal atom. The polymer compound may contain at least one of the repeating unit in which M is a hydrogen atom and the repeating unit in which M is an alkali metal atom. That is, the repeating unit of formula (1) contained in the polymer compound may be only the repeating unit of formula (1) in which M is a hydrogen atom or only the repeating unit of formula (1) in which M is an alkali metal atom, or may contain both. Preferred alkali metal atoms include Li, Na, and K. When M is an alkali metal atom, only one type of alkali metal atom may be contained, or a plurality of types of alkali metal atoms may be contained, as M in formula (1) of the polymer compound.

In the polymer compound, the total ratio of the repeating unit represented by formula (1) is not limited as long as the total ratio of the repeating unit represented by formula (3) is less than 2 mol %. From the viewpoint of further reducing the initial resistance value of the secondary battery, when the total ratio of repeating units constituting the polymer compound is taken as 100 mol %, the lower limit of the total ratio of the repeating unit represented by formula (1) is preferably 5 mol %, and more preferably 10 mol %, while the upper limit is preferably 95 mol %, more preferably 80 mol %, and still more preferably 50 mol %. Preferred ranges are 5 to 95 mol %, 5 to 80 mol %, 5 to 50 mol %, 10 to 95 mol %, 10 to 80 mol %, and 10 to 50 mol %.

The repeating unit represented by formula (2) is a vinyl alcohol repeating unit.

In the polymer compound, the total ratio of the repeating unit represented by formula (2) is not limited as long as the total ratio of the repeating unit represented by formula (3) is less than 2 mol %. From the viewpoint of further reducing the initial resistance value of the secondary battery, when the total ratio of repeating units constituting the polymer compound is taken as 100 mol %, the lower limit of the total ratio of the repeating unit represented by formula (2) is preferably 5 mol %, more preferably 20 mol %, and still more preferably 50 mol %, while the upper limit is preferably 95 mol %, and more preferably 90 mol %. Preferred ranges are 5 to 95 mol %, 5 to 90 mol %, 20 to 95 mol %, 20 to 90 mol %, 50 to 95 mol %, and 50 to 90 mol %.

The repeating unit represented by formula (3) is a repeating unit with a lactone structure.

In formula (3), $R^2$ is a hydrogen atom or a methyl group. The polymer compound may contain at least one of the repeating unit in which $R^2$ is a hydrogen atom and the repeating unit in which $R^2$ is a methyl group. That is, the repeating unit of formula (3) contained in the polymer compound may be only the repeating unit of formula (3) in which $R^2$ is a hydrogen atom or only the repeating unit of formula (3) in which $R^2$ is a methyl group, or may contain both.

In the polymer compound, when the total ratio of repeating units constituting the polymer compound is taken as 100 mol %, the total ratio of the repeating unit represented by formula (3) is less than 2 mol %. The lower limit of the total ratio of the repeating unit represented by formula (3) is preferably 0.0 mol % or more, more preferably 0.1 mol % or more, and still more preferably 0.4 mol % or more, while the upper limit is less than 2 mol %, preferably 1.8 mol % or less, more preferably 1.6 mol % or less, and particularly preferably 1.5 mol % or less.

In the polymer compound, the repeating units represented by formulae (1), (2), and (3) may be arranged either randomly or as blocks, preferably randomly from the viewpoint of further reducing the initial resistance value.

When the total ratio of repeating units constituting the polymer compound is taken as 100 mol %, the ratio of the sum of the total ratio of the repeating unit represented by formula (1), the total ratio of the repeating unit represented by formula (2), and the total ratio of the repeating unit represented by formula (3) in the polymer compound is preferably 80 mol % or more, more preferably 90 mol % or more, still more preferably 95 mol % or more, particularly preferably 95 mol % or more, and may even be 100 mol % (that is, the repeating units constituting the polymer compound may contain only the repeating units represented by formulae (1), (2), and (3)), from the viewpoint of further reducing the initial resistance value.

The repeating units constituting the polymer compound may contain another repeating unit different from the repeating units represented by formulae (1). (2) and (3). Such another repeating unit may be a repeating unit formed by a monomer copolymerizable with the monomers forming the repeating units represented by formulae (1), (2) and (3). Examples of such copolymerizable monomers include monomers with ethylenically unsaturated bonds. Specific examples of monomers with ethylenically unsaturated bonds include acrylic esters, vinyl acetate, styrene, vinyl chloride, ethylene, butadiene, acrylamide, vinylsulfonic acid, and maleic acid.

The number average molecular weight of the polymer compound is, for example, about 10,000 to 8,000,000, preferably about 30,000 to 1,000,000, although not limited thereto. The number average molecular weight of the polymer compound is the value as determined based on polyethylene glycol/polyethylene oxide standards by gel permeation chromatography (GPC).

The method for producing the polymer compound containing the repeating units represented by formulae (1), (2) and (3) may be any known method for producing a copolymer, without limitation. One example of known methods for producing copolymers is the method for producing a copolymer of a vinyl alcohol and an alkali metal-neutralized product of ethylenically unsaturated carboxylic acid disclosed in WO 2017/168947. After the copolymer is produced, a lactone structure is formed while adjusting the progress of the ring-closing reaction at the position where the repeating unit represented by formula (1) and the repeating unit represented by formula (2) are adjacent to each other, so that the total ratio of the repeating unit represented by formula (3) is adjusted to less than 2 mol %. Alternatively, the polymer compound containing the repeating units represented by formulae (1) and (2) may be produced by a method in which the monomers forming the repeating units are copolymerized while heating at a low temperature under acidic conditions. Examples of other methods for forming the lactone structure of the repeating unit represented by formula (3) in the polymer compound include adjusting the drying temperature and the drying time for the copolymer; and placing the copolymer in an acidic environment.

In the binder of the present invention, the ratio of the polymer compound is preferably 80% by mass or more, more preferably 90% by mass or more, and still more preferably 95% by mass or more, and may even be 100% by mass (that is, the binder of the present invention may contain only the polymer compound), as long as the initial resistance value is reduced.

The binder of the present invention may contain another binder material different from the polymer compound. Examples of other binder materials include aqueous binders soluble or dispersible in water. Specific examples of other binder materials include carboxymethylcellulose (CMC), acrylic resin, sodium polyacrylate, sodium alginate, polyimide (PI), polyamide, polyamideimide, polyacryl, styrene-butadiene rubber (SBR), styrene-ethylene-butylene-styrene copolymer (SEBS), polyvinyl alcohol (PVA), and ethylene vinyl acetate copolymer (EVA). These other binder materials may be contained alone or in combinations of two or more, in the binder of the present invention. When another binder material is contained in the binder of the present invention, the content can be adjusted appropriately in the range of 0 to 100 parts by mass per 100 parts by mass of the polymer compound.

The binder of the present invention is suitable for use as a binder for a secondary battery (for an electrode or separator), particularly as a binder contained in a mixture for a secondary battery electrode. For a secondary battery electrode, the binder can be applied to both positive and negative electrodes.

2. Mixture for Secondary Battery Electrode

The mixture for a secondary battery electrode of the present invention (hereinafter sometimes referred to as "the electrode mixture") comprises the binder for a secondary battery of the present invention and an active material. As described above, the binder of the present invention, which can reduce the initial resistance value of the secondary battery, is suitable for use as a mixture for a secondary battery electrode, together with the active material.

In the electrode mixture of the present invention, the content of the binder of the present invention is preferably 0.5 to 40% by mass, more preferably 1 to 25% by mass, and still more preferably 1.5 to 10% by mass. When the content of the binder of the present invention is 0.5% by mass or more, deterioration of cycle life characteristics due to insufficient binding force, agglomeration due to an insufficient viscosity of the slurry, and the like can be prevented. On the other hand, when the binder content is 40% by mass or less, a high capacity tends to be obtained upon charge/discharge of the battery.

The electrode mixture of the present invention can be produced by using the binder of the present invention, using known methods. For example, the electrode mixture can be produced by mixing the active material, the binder of the present invention, water, and optionally a conductive assistant, a dispersion assistant, and the like, to form a pasty slurry. The timing of adding water is not limited. The binder of the present invention may be previously dissolved in water and then mixed with the active material and the like to form a slurry. Alternatively, the active material, the binder of the present invention, and optionally a conductive assistant, a dispersion assistant, and the like may be mixed together in a solid state, and then water may be added to form a pasty slurry.

In the electrode mixture of the present invention, the ratio of water is preferably 40 to 2,000 parts by mass, and more preferably 50 to 1.000 parts by mass, per 100 parts by mass of solids in the electrode mixture. When the ratio of water is in the above-defined range, handleability of the electrode mixture (slurry) of the present invention tends to be further improved.

[Active Material]

The active material is an electrode active material, including a negative electrode active material and a positive electrode active material. When, for example, the active material is a negative electrode active material, it may contain, for example, a carbon material, and may also contain, for example, at least one of silicon and silicon oxide. Specific materials of the negative electrode active material and the positive electrode active material are described below.

(Negative Electrode Active Material)

Negative electrode active materials used in the art may be used without limitation as the negative electrode active material, for example, carbon materials, such as crystalline carbon or amorphous carbon. Examples of crystalline carbon include graphite such as natural or artificial graphite in an amorphous, plate-like, flake, spherical or fibrous form. Examples of amorphous carbon include soft carbon (graphitizable carbon) or hard carbon (non-graphitizable carbon), mesophase pitch carbide, and calcined coke. Moreover, a material capable of intercalation and deintercalation of a large number of lithium ions, such as silicon (Si), tin (Sn), or Ti (titanium), may also be used as the negative electrode active material. Any such materials, which may be in the form of any of a single material, an alloy, a compound, a solid solution, and a composite active material containing a silicon-containing material, a tin-containing material, and a titanium-containing material, can exhibit the effects of the present invention. The silicon-containing material may be Si, SiOx ($0.05<x<1.95$), or an alloy, a compound, or a solid solution thereof obtained by partially substituting Si with at least one element selected from the group consisting of B, Mg, Ni, Ti, Mo, Co, Ca, Cr, Cu, Fe, Mn, Nb, Ta, V, W, Zn, C, N, and Sn. These materials may be referred to as silicon or silicon oxide. The tin-containing material may be $Ni_2Sn_4$, $Mg_2Sn$, SnO, ($0<x<2$), $SnO_2$, $SnSiO_3$, or LiSnO, for example. The titanium-containing material may be a lithium titanate, such as $Li_2TiO_3$ or $Li_4TisO_{12}$, or a titanium-niobium composite compound, for example. These materials may be used alone or in combinations of two or more. Preferred among these is silicon or silicon oxide, such as Si alone or silicon oxide.

More preferred as the negative electrode active material is a composite obtained by mixing first and second negative electrode active materials, using silicon or silicon oxide as the first negative electrode active material, and a carbon material as the second negative electrode active material. In this case, the mixture ratio of the first and second negative electrode active materials is preferably 5/95 to 95/5 in terms of mass ratio. Any carbon materials commonly used in nonaqueous electrolyte secondary batteries may be used as the carbon material, and representative examples include crystalline carbon, amorphous carbon, or a combination thereof. Examples of crystalline carbon include graphite such as natural or artificial graphite in an amorphous, plate-like, flake, spherical or fibrous form. Examples of amorphous carbon include soft carbon or hard carbon, mesophase pitch carbide, and calcined coke.

The method for producing the negative electrode active material is not limited. To produce the active material composite formed of the mixture of the first and second negative electrode active materials, the method is not limited as long as it can homogeneously disperse these active materials. An example of methods for producing the negative electrode active material is a method in which the first and second negative electrode active materials are mixed in a ball mill. Another example is a method in which a precursor of the second negative electrode active material is deposited on the surface of the particles of the first negative electrode active material, and then carbonized by a heat-treatment method. The precursor of the second negative electrode active material may be any carbon precursor that can be formed into a carbon material by heat treatment, and examples include glucose, citric acid, pitch, tar, and binder materials (such as polyvinylidene fluoride, carboxymethylcellulose, acrylic resin, sodium polyacrylate, sodium alginate, polyimide, polytetrafluoroethylene, polyamide, polyamideimide, polyacryl, styrene-butadiene rubber, polyvinyl alcohol, and ethylene-vinyl acetate copolymer).

The heat-treatment method is a method in which the carbon precursor is subjected to heat treatment at 600 to 4,000° C. in a non-oxidizing atmosphere (an atmosphere that prevents oxidation, such as a reducing atmosphere, an inert atmosphere, or a reduced pressure atmosphere) and carbonized to have conductivity.

[Positive Electrode Active Material]Any positive electrode active materials used in the art may be used without limitation as the positive electrode active material. The positive electrode active material may be a lithium-containing composite oxide, for example. Examples of lithium-containing composite oxides include $LiMnO_2$, $LiFeO_2$, $LiCoO_2$, $LiMn_2O_4$, $Li_2FeSiO_4$, $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$, $LiNi_xCo_yM_2O_2$ (wherein $0.01<x<1$, $0\leq y\leq 1$, $0\leq z\leq 1$, $x+y+z=1$, and M is at least one element selected from the group consisting of Mn, V, Mg, Mo, Nb, Fe, Cu, and Al), and $LiFePO_4$.

[Conductive Assistant]

Any conductive assistants used in the art may be used without limitation as the conductive assistant. While the conductive assistant is not limited as long as it has conductivity, the conductive assistant is preferably carbon powder. Examples of carbon powder include commonly used carbon materials, such as acetylene black (AB), Ketjen black (KB), graphite, carbon fibers, carbon tubes, graphene, amorphous carbon, hard carbon, soft carbon, glassy carbon, carbon nanofibers, and carbon nanotubes. These materials may be used alone or in combinations of two or more.

The ratio of the conductive assistant is preferably 0.1 to 30% by mass, more preferably 0.5 to 10% by mass, and still more preferably 2 to 5% by mass, relative to total 100% by mass of the active material, the binder, and the conductive assistant, although not limited thereto. If the ratio of the conductive assistant is less than 0.1% by mass, the conductivity of the electrode may not be sufficiently improved. If the ratio of the conductive assistant is above 30% by mass, this is undesirable in that: the ratio of the active material relatively decreases, which makes it difficult to obtain a high capacity upon charge/discharge of the battery; carbon repels water, which makes it difficult to homogeneously disperse the active material, leading to agglomeration of the active material; and the amount of the binder to be used increases because the conductive assistant is smaller in size, and thus, is larger in surface area than the active material.

[Dispersion Assistant]

The electrode mixture of the present invention may further contain a dispersion assistant. While the dispersion assistant is not limited, it is preferably a humic acid or an organic acid containing a carboxy group and at least one substituent selected from the group consisting of a hydroxyl group, an amino group, and an imino group. Examples of organic acids having a hydroxyl group and a carboxy group include lactic acid, tartaric acid, citric acid, malic acid, glycolic acid, tartronic acid, glucuronic acid, and humic acid. Examples of organic acids having an amino group and a carboxy group include glycine, alanine, phenylalanine, 4-aminobutyric acid, leucine, isoleucine, lysine, glutamic acid, aspartic acid, glutamine, asparagine, histidine, tryptophan, cysteine, and polymers thereof. Examples of organic acids having an imino group and a carboxy group include proline, 3-hydroxyproline, 4-hydroxyproline, and pipecolic acid. Preferred among these are glucuronic acid, humic acid, glycine, polyglycine, aspartic acid, and glutamic acid, because they are readily available.

The ratio of the dispersion assistant may be 0.01 part by mass or more, relative to total 100 parts by mass of the active material, the binder, and the conductive assistant, in order to finely disperse the active material and the like efficiently and effectively during the preparation of an active material dispersion. To maintain the fine dispersibility and dispersion stability, a sufficient amount of the dispersion assistant to be added is 5.0 parts by mass or less.

The electrode mixture of the present invention may contain other conventional additives and the like.

In the electrode mixture of the present invention, the binder of the present invention is used for the purpose of bonding particles of the active material, bonding the active material and the conductive assistant, and bonding the active material or the conductive assistant and a current collector. That is, the binder of the present invention is used to form a satisfactory active material layer when the slurry is applied onto the current collectors of both electrodes, and dried.

3. Electrode for Secondary Battery

The electrode for a secondary battery of the present invention (hereinafter sometimes referred to as "the electrode") comprises the above-described mixture for a secondary battery electrode of the present invention. The electrode of the present invention is produced by using the mixture for a secondary battery electrode of the present invention (i.e., using the binder of the present invention), according to methods employed in the art. That is, the electrode of the present invention can be produced by, for example, applying the electrode mixture of the present invention onto a current collector, and drying.

When the electrode of the present invention is a negative electrode, the material constituting the current collector may be, for example, a conductive material such as C, Cu, Ni, Fe, V, Nb, Ti, Cr, Mo, Ru, Rh, Ta, W, Os, Ir, Pt, Au, or AI, or an alloy containing two or more of these conductive materials (such as stainless steel). Alternatively, the current collector may be Fe plated with Cu. The material constituting the current collector of the negative electrode is preferably Co, Ni, or stainless steel, for example, in that they have high electrical conductivity, and have excellent oxidation resistance and stability in an electrolytic solution. Cu or Ni is preferred in terms of material cost.

When the electrode of the present invention is a positive electrode, the material constituting the current collector may be, for example, a conductive material such as C. Ti, Cr, Mo, Ru, Rh, Ta, W, Os, Ir, Pt, Au, or Al, or an alloy containing two or more of these conductive materials (such as stainless steel). The material constituting the current collector of the positive electrode is preferably C, Al, or stainless steel, for example, in that they have high electrical conductivity, and have excellent oxidation resistance and stability in an electrolytic solution. Al is preferred in terms of material cost.

The shape of the current collector may be, for example, a foil-like substrate or a three-dimensional substrate, although not limited thereto. The use of a three-dimensional substrate (such as a metal foam, a mesh, a woven fabric, a nonwoven fabric, or an expanded metal) provides an electrode having a high capacity density, even if the binder has poor adhesion to the current collector. Additionally, satisfactory high-rate charge/discharge characteristics are achieved.

4. Secondary Battery

The secondary battery of the present invention comprises the above-described electrode for a secondary battery of the present invention. The secondary battery of the present invention may comprise the electrode for a secondary battery of the present invention as either one of or both a positive electrode and a negative electrode. The secondary battery of the present invention is produced by using the electrode for a secondary battery of the present invention (i.e., using the binder of the present invention), according to methods employed in the art.

The secondary battery of the present invention is preferably a nonaqueous electrolyte secondary battery, particularly a lithium-ion secondary battery. Because the lithium-ion secondary battery must contain lithium ions, the electrolyte is preferably a lithium salt. Examples of the lithium salt include lithium hexafluorophosphate, lithium perchlorate, lithium tetrafluoroborate, lithium trifluoromethanesulfonate, and lithium trifluoromethanesulfonimide. These electrolytes may be used alone or in combinations of two or more.

Examples of electrolytic solutions include propylene carbonate, ethylene carbonate, dimethyl carbonate, diethyl carbonate, and 7-butyrolactone. These electrolytic solutions may be used alone or in combinations of two or more. Particularly preferred is propylene carbonate alone, a mixture of ethylene carbonate and diethyl carbonate, or 7-butyrolactone alone. In the mixture of ethylene carbonate and diethyl carbonate, the mixture ratio can be adjusted as desired such that the ratio of one component falls within the range of 10 to 90% by volume.

Known secondary battery structures can be similarly employed for other secondary batteries.

EXAMPLES

The present invention will be hereinafter described in detail with reference to examples and comparative examples, although the present invention is not limited to the examples.

[Synthesis of Binder for Secondary Battery]

Production Example 1

In a reaction vessel equipped with a stirrer, a thermometer, a $N_2$ gas inlet tube, a reflux condenser, and a dropping funnel, 768 parts by mass of water and 12 parts by mass of anhydrous sodium sulfate were placed, and $N_2$ gas was blown into the reaction vessel to deoxidize the system. Subsequently, 1 part by mass of partially saponified polyvinyl alcohol (degree of saponification: 88%) and 1 part by mass of lauryl peroxide were placed in the reaction vessel, and the inside temperature was increased to 60° C.; thereafter, a previously prepared mixture of 51.8 parts by mass of methyl acrylate and 208 parts by mass of vinyl acetate was added dropwise through the dropping funnel over 4 hours. Then, the inside temperature was maintained at 65° C. for 2 hours. Then, the solids were filtered off. In the same reaction vessel as above, the solids, 450 parts by mass of methanol, 420 parts by mass of water, 132 parts by mass of sodium hydroxide, and 0.52 part by mass of hydrazine were placed, and the mixture was stirred at 30° C. for 3 hours. After completion of stirring, the reaction solution was neutralized, the solid was filtered off and then washed with methanol, and dried at 60° C. under reduced pressure for 8 hours to obtain a copolymer of a vinyl alcohol and an alkali metal-neutralized product of ethylenically unsaturated carboxylic acid (binder for a secondary battery). The yield was 193 g. As a result of $^1$H-NMR (BRUKER) measurement of the obtained copolymer under the following conditions, the total ratio of the repeating unit containing the lactone structure represented by formula (3) was 1.0 mol % when the total ratio of repeating units constituting the copolymer was taken as 100 mol %. Table 1 shows the total ratio of each of the repeating units represented by formulae (1), (2), and (3) constituting the copolymer.

(Identification of Repeating Units by $^1$H-NMR)

2 g of the obtained copolymer was measured out, 33 g of heavy water was added thereto, and the copolymer was dissolved by heating at 90° C. for 3 hours. The obtained heavy water solution was subjected to NMR measurement under the following conditions.

Apparatus: AVANCE IIIHD 400 (AVANCE III 400), manufactured by Bruker

Measurement method: $^1$H NMR

Measurement nucleus frequency: bf1 (400.1300000)

Spectral width: Sw (20.5524)

Observation point: td (65536)

Data point: Si (65536)

Measurement temperature: 27° C.

Production Example 2

A copolymer of a vinyl alcohol and an alkali metal-neutralized product of ethylenically unsaturated carboxylic acid (binder for a secondary battery) was obtained as in Production Example 1. As a result of $^1$H-NMR (BRUKER) measurement of the obtained copolymer as described above, the total ratio of the repeating unit containing the lactone structure represented by formula (3) was 1.3 mol % when the total ratio of repeating units constituting the copolymer was taken as 100 mol %. Table 1 shows the total ratio of each of the repeating units represented by formulae (1), (2), and (3) constituting the copolymer.

Although the copolymers of Production Examples 1 and 2 were produced in the same manner, the total ratio of the repeating unit containing the lactone structure represented by formula (3) was different, i.e., 1.0 mol % or 1.3 mol %. This is believed to be due to an error occurred in the operations during the process of producing the copolymers.

Production Example 3

A copolymer of a vinyl alcohol and an alkali metal-neutralized product of ethylenically unsaturated carboxylic acid (binder for a secondary battery) was obtained as in Production Example 1, except that the final drying step in Production Example 1 was performed at 70° C. under reduced pressure. As a result of $^1$H-NMR (BRUKER) measurement of the obtained copolymer as in Production Example 1, the total ratio of the repeating unit containing the lactone structure represented by formula (3) was 2.0 mol % when the total ratio of repeating units constituting the copolymer was taken as 100 mol %. Table 1 shows the total ratio of each of the repeating units represented by formulae (1), (2), and (3) constituting the copolymer.

Production Example 4

In a 2-L reaction vessel equipped with a stirrer, a thermometer, a $N_2$ gas inlet tube, and a reflux condenser, 21 parts by mass of the copolymer obtained in Production Example 1 and 189 parts by mass of water were placed, and the mixture was stirred at 90° C. for 3 hours. Subsequently, 2 parts by mass of 90% by mass acetic acid was added dropwise, and stirred under acidic conditions. Subsequently, 1500 parts by mass of acetone was added dropwise, the mixture was stirred at 5° C. for 1 hour, and then the solids were filtered off. The filtered solids were dried at 60° C. under reduced pressure for 8 hours. As a result of $^1$H-NMR (BRUKER) measurement of the obtained copolymer as in Production Example 1, the total ratio of the repeating unit containing the lactone structure represented by formula (3) was 5.0 mol % when the total ratio of repeating units constituting the copolymer was taken as 100 mol %. Table 1 shows the total ratio of each of the repeating units represented by formulae (1), (2), and (3) constituting the copolymer.

Production Example 5

A copolymer of a vinyl alcohol and an alkali metal-neutralized product of ethylenically unsaturated carboxylic acid (binder for a secondary battery) was obtained as in Production Example 1, except that the final drying step in Production Example 1 was performed at 90° C. under reduced pressure. As a result of $^1$H-NMR (BRUKER) measurement of the obtained copolymer as in Production Example 1, the total ratio of the repeating unit containing the lactone structure represented by formula (3) was 10.5 mol % when the total ratio of repeating units constituting the copolymer was taken as 100 mol %. Table 1 shows the total ratio of each of the repeating units represented by formulae (1). (2), and (3) constituting the copolymer.

[Production of Mixture for Secondary Battery Electrode and Electrode]

Example 1

4 parts by mass of the copolymer obtained in Production Example 1 was dissolved in 96 parts by mass of water to obtain an aqueous solution of a binder (binder composition). Next, 90.2 parts by mass of artificial graphite (MAG-D manufactured by Hitachi Chemical Co., Ltd.) and 6.8 parts by mass of silicon monoxide (OSAKA Titanium technologies) as electrode active materials were added to 75 parts by mass of the aqueous binder solution, and the mixture was kneaded. Additionally, 96 parts by mass of water for adjusting the viscosity was added, and the mixture was kneaded to prepare a negative electrode mixture in slurry form. The negative electrode mixture was applied onto a rolled copper foil having a thickness of 18 μm and dried; thereafter, the rolled copper foil and the coating were tightly bonded together using a roll press (manufactured by Oono-Roll Corporation) and then subjected to heat treatment (under reduced pressure at 120° C. for 12 hours or more) to produce a negative electrode. The thickness of the active material layer in the negative electrode was 42 μm, and the capacity density of the negative electrode was 3.24 mAh/cm$^2$.

Example 2

A negative electrode was produced as in Example 1, except that the copolymer obtained in Production Example 2 was used as the binder.

Comparative Example 1

A negative electrode was produced as in Example 1, except that the copolymer obtained in Production Example 3 was used as the binder.

Comparative Example 2

A negative electrode was produced as in Example 1, except that the copolymer obtained in Production Example 4 was used as the binder.

Comparative Example 3

A negative electrode was produced as in Example 1, except that the copolymer obtained in Production Example 4 was used as the binder.

[Initial Resistance Value]

(Assembly of Battery)

A coin cell (CR2032) was produced which included each of the negative electrodes obtained in Examples 1 and 2, and Comparative Examples 1 to 3, and the below-shown positive electrode, separator, and electrolytic solution.

Positive electrode: lithium cobaltate (manufactured by Hassan Co., Ltd.)

Separator: glass filter (trade name: GA-100 manufactured by Advantec Co., Ltd.)

Electrolytic solution: a solution obtained by dissolving $LiPF_6$ at a concentration of 1 mol/L in a solvent prepared by mixing ethylene carbonate (EC) and ethyl methyl carbonate (EMC) at a volume ratio of 1:1, and adding 1% by mass of vinylene carbonate (VC) as an additive for the electrolytic solution.

(Method of Evaluating Initial Resistance)

Each of the coin cells produced as described above was subjected to aging of the battery, as follows: it was subjected to three cycles in which the coin cell was charged to 4.2 V at a current corresponding to 0.1 C and discharged to 3V at a current corresponding to 0.1 C, and subjected to three cycles in which the coin cell was charged to 4.2 V at a current corresponding to 0.5 C and discharged to 3V at a current corresponding to 0.5 C. Subsequently, at 30° C., the coin cell was charged to SOC 50 at a current corresponding to 0.5 C, subjected to constant current discharge at 0.2 C for 10 seconds and then charged to SOC 50 at 0.1 C, subjected to constant current discharge at 0.5 C for 10 seconds and then charged to SOC 50 at 0.1 C, subjected to constant current discharge at 1 C for 10 seconds and then charged to SOC 50 at 0.1 C. The direct current resistance of the cell was calculated from the values of average voltage and discharge current for 10 seconds for each C-rate. The direct current resistance thus calculated was used as the initial resistance. Table 1 shows the initial resistance value for each coin cell.

TABLE 1

| | Total Ratio of Each Repeating Unit Constituting Copolymer | | | |
|---|---|---|---|---|
| | Formula (1) Acrylic Acid-Based Repeating Unit | Formula (2) Vinyl Alcohol Repeating Unit | Formula (3) Repeating Unit Containing Lactone Structure | Initial Resistance Value Ω |
| Example 1 | 17.2 mol % | 81.8 mol % | 1.0 mol % | 22.6 |
| Example 2 | 19.0 mol % | 79.7 mol % | 1.3 mol % | 22.7 |
| Comparative Example 1 | 17.9 mol % | 80.1 mol % | 2.0 mol % | 24.1 |
| Comparative Example 2 | 16.5 mol % | 78.5 mol % | 5.0 mol % | 24.6 |
| Comparative Example 3 | 15.3 mol % | 74.3 mol % | 10.4 mol % | 26.5 |

Each of the electrodes (negative electrodes) of Examples 1 and 2 is an electrode for a secondary battery obtained using an electrode mixture comprising each of the binders produced in Production Examples 1 and 2 (a binder for a secondary battery comprising a copolymer (polymer compound) that contains the repeating units represented by formulae (1), (2), and (3), and in which when the total ratio of repeating units constituting the copolymer is taken as 100 mol %, the total ratio of the repeating unit represented by formula (3) is less than 2 mol %); and an active material. It is observed that the electrodes of Examples 1 and 2 have lower initial resistance values, and can reduce the initial resistance values of the secondary batteries.

The invention claimed is:

1. A binder for a secondary battery, comprising a polymer compound, wherein the polymer compound contains repeating units represented by formulae (1), (2), and (3):

[Formula 1]

(1)

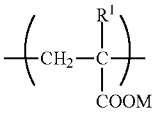

(2)

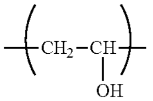

-continued (3)

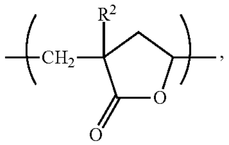

wherein in formula (1), $R^1$ is a hydrogen atom or a methyl group, and M is a hydrogen atom or an alkali metal atom; and in formula (3), $R^2$ is a hydrogen atom or a methyl group; and wherein when a total ratio of repeating units constituting the polymer compound is taken as 100 mol %, a total ratio of the repeating unit represented by formula (3) is 0.1 mol % or more and less than 2 mol %, and a total ratio of the repeating unit represented by formula (1) is 5 mol % or more and 20 mol % or less.

2. A mixture for a secondary battery electrode, comprising the binder for a secondary battery according to claim 1 and an active material.

3. The mixture for a secondary battery electrode according to claim 2, wherein the active material contains a carbon material.

4. The mixture for a secondary battery electrode according to claim 2, wherein the active material contains at least one of silicon and silicon oxide.

5. An electrode for a secondary battery, comprising the mixture for a secondary battery electrode according to claim 2.

6. A secondary battery comprising the electrode for a secondary battery according to claim 5.

7. A lithium-ion secondary battery comprising the electrode for a secondary battery according to claim 5.

* * * * *